United States Patent Office 3,352,701
Patented Nov. 14, 1967

3,352,701
PROCESS OF APPLYING d-LIMONENE
VARNISHES TO AN IMAGE BEARING
SURFACE
Paul C. Goetz, 1333 Avalon St., Beaumont, Calif. 92223, and Carlos C. Goetz, Avenida Luiz Bivar 36-V-E, Lisbon, Portugal
No Drawing. Filed Mar. 12, 1964, Ser. No. 351,514
5 Claims. (Cl. 106—237)

This invention relates generally to improvements in varnishes and paints, but more specifically to the application of d-limonene as a major and essential ingredient for modifying and improving the characteristics thereof.

In this art, oil-resin varnishes are distinguished from spirit-resin varnishes. In the drying of oil-resin varnishes, chemical changes take place in the composition including oxidation and polymerization; while in the drying of spirit-resin varnishes, drying is effected substantially by evaporation of the volatile solvent from the non-volatile resin component.

It has been found in connection with spirit-resin varnishes, however, that apparently there is not a 100% evaporation of the solvent. Unevaporated or retained portions of specific solvents have various effects on the overall performance of the resultant film of the resin or non-volatile film-forming substance with respect to gloss, hardness, adhesion, flexibility, tensile strength, thermal distortion, brittle point, resistance to humidity, etc.

As a result of research and experimentation, applicants have therefore come to the conclusion that there is a permanent and important relationship between the specific volatile solvent or solvents used in the composition of a spirit-resin varnish and the resultant film or resin coating. The unevaporated or retained portion of the volatile solvent, small as it may be, seems to remain permanently within the resin film or coating inducing similar effects as in the drying of oil-resin varnishes.

Applicants have further come to the conclusion that the volatile solvent of a spirit-resin varnish even during the period of evaporation influences the surviving varnish or resin coat or film structure for better or for worse.

An object of the invention, therefore, is to select matching volatile solvents and non-volatile ingredients including resins for improving the characteristics of varnishes and paints.

The volatile solvents in present use such as standard turpentine, dipentene and others have many disadvantages including:
 (1) Toxicity.
 (2) Obnoxious smell.
 (3) Tendency to cause excessive sheen; unfavorable mirror effect; and unfavorable index of refraction.
 (4) Tendency to discoloration, thereby accelerating discoloration tendencies of the resin itself.
 (5) Tendency to become opaque, thereby accelerating tendencies for resin to become opaque.
 (6) Tendency to harden the resin, thereby provoking craquele different from that of the underlying paint.
 (7) Tendency to make the resin more brittle.
 (8) Rapid aging, thereby accelerating the same process in the resin.
 (9) Oxidation from the atmosphere and its humidity, thereby accelerating the same process in the resin.

The functions of varnish coatings are to preserve and retard aging of the underlying work, protect it against physical damage and at the same time to maintain or even enhance aesthetic values.

Changes such as oxidation of a work of art take place with the passage of time particularly at the surface.

Such changes alter color values and diminish aesthetic qualities. The varnish coating and particularly the original solvent thereof may be contributing factors to this type of deterioration.

Because of the above disadvantages and the adverse effects, it has been common practice, for example, to replace periodically the old varnish coating over a painting, an operation which is delicate and which can lead to irreparable damage.

Currently, most paints and pigments are oil colors supplied in tubes, and before application the portions squeezed out are exposed to light and air and then mixed with a few drops of an oil such as linseed oil for improving fluidity. This type of oil is one of the causes of future discoloration. As a result, it becomes difficult to obtain and maintain desired color values, a factor which is of particular importance in the field of restorations.

For this purpose, some manufacturers offer a special type of varnish called "Retoucher Varnish" adapted to be mixed with the paint just before the restoring. However, it has been found that such retouching varnishes also oxidize more or less and become resinous. Upon drying of the paint applied on the restored areas, there results therefore a certain discoloration as compared with the surrounding unretouched areas. As time goes on, the discoloration becomes more and more pronounced.

Objects of the invention are to overcome the foregoing inadequacies and to add to the beauty and aesthetic values of pictorial representations and other works. For such purposes, applicants have found that utilization of specific solvents and adequate resins and other non-volatile ingredients in association effectuate such objects.

Specific solvents are d-limonene either alone or in combination with standard dipentene can be used with known resins or gums to produce desired varnish solutions. As examples of said resins are natural forms as damar, mastic, etc.; also synthetic forms or a mixture of natural and synthetic forms of resins. Such varnish solutions may be used to replace linseed oil or other oils when mixing with pigments or paints; may also be used for producing an emulsion or dispersion with powdered pigment; and may be used as a retouching varnish by mixing with paint to give superior results.

Such varnish solutions are applied by known methods including brushing, spraying or blowing; they dry well and resultant coatings are easy to remove where such removal becomes advisable.

In the field of restoration, the restorer, when using oil colors, normally squeezes a portion of paint from a tube on to the palette and before using it may wet his brush either with linseed or other oil, or with standard retouching varnish solution. With the thus wetted brush, he then mixes the paint on the palette and the prepared mixture is applied to the areas or spots to be restored.

Surprising and unexpected results stem from use of the new varnish solutions for paint mixing in the general field of painting and as a substitute for linseed and other oils. New and improved color values result showing considerable differences over those of oil colors mixed by the old method. There are enhanced effects in beauty, purity and transparency; and paintings placed side by side executed with paints of the old and new methods show startling differences.

The new varnish solutions when combined with higher aliphatic alcohols such as octadecanol and cetyl alcohol for formation of suspensions, emulsions or solutions provide products whose effects are an improvement over the mixtures of standard varnish solutions with such higher aliphatic alcohols as disclosed in U.S. Patent No. 2,644,261. By reason of the utilization of d-limonene alone or the combination of standard dipentene (not impurity free) therewith, it becomes possible to increase the ratio of alcohol to the resin ingredient of the varnish. In U.S. 2,644,261, the maximum proportions therein stated is one part alcohol to four parts varnish resin. Applicants have now obtained unexpected and better results by increasing the ratio of alcohol to varnish resin such as one part alcohol to three parts resin.

Moreover, the quantity of higher alcohol in proportion to the varnish resins can easily be further increased to give new and unexpected results, particularly on photographs. When applying one part alcohol to two parts varnish resins, one obtains a clear semi-mat to mat surface which in many cases increases the pictorial qualities. One can even go higher, as for instance one part alcohol to one part resin. Depending on the percentage in relation to the solvent, one must eventually resort to heat for dissolving, as for instance if the quantity of alcohol plus resin is about fifty percent of the quantity of the solvent. The resulting solution can be applied, in its liquid and hot state, by brush or other known methods and distributed evenly before getting cold for solidification over the entire surface of the picture. If this solidification is too rapid, depending on the ingredients used, their respective quantities and proportions and room temperature, certain ingredients can be added in order to retard this solidification, such as octanol, butanol, etc. Thus, a typical composition could be 100 milliliters d-limonene, 25 grams resin, 25 grams higher alcohol and 1 or 2 milliliters of retarder.

One can even go much farther in the relation of higher alcohol to varnish resins and applicants have obtained good results with as high as three parts alcohol to one part resin.

Thus, a varnish was prepared from 250 ml. of d-limonene with 130 grams of mastic grains and resulted in 350 ml. of final solution with a specific gravity of .915. The solution consequently contained about one-third of varnish resin. Then 30 ml. of this solution were added to three grams of cetyl alcohol (or octadecanol) so that we got a solution having one part alcohol to about three parts varnish resin.

As is well known, there are some synthetic and also natural resins with excellent, all-around qualities, except that they are brittle. Various ingredients or additions have been recommended and are used to attenuate this brittleness, as for instance linseed oil. However, little effect results.

Applicants have found, through continuous experimentation and research, that the addition of higher alcohols, especially cetyl alcohol, reduces the brittleness to a high degree. Even common rosin could then be used as the main varnish resin, as shown in the following example. We give this example to show what can be done and not as a recommendation of common rosin when paintings or photographs are involved.

For example, we took 2.5 grams of common rosin, 1.75 grams of cetyl alcohol and 0.75 gram of octadecanol and dissolved same in 15 ml. d-limonene. This was then applied in a thin coating to a lithographic print; it dried in one day to a hard yet flexible film of good appearance.

The higher alcohols dissolve well in the d-limonene and application of the varnish to oil paintings resulted in glareless coats (mat) which, nevertheless, had excellent transparency and full color values showing minute details of brush stroke and impasto. The picture gained three-dimensional qualities. The same effects resulted when the solution containing the higher alcohol was applied to photographs, either black-white or colored, as by color emulsion or pigment overpainting.

By increasing the percentage of higher alcohol, the solution becomes a gel and finally a wax-like substance; and in such form may be applied as a surface coating over pictorial representations and other works of art. In the waxy form, the composition advantageously replaces the known products heretofore used for waxing.

This new varnish solution incorporating d-limonene as the solvent per se or a mixture of standard dipentene and d-limonene as the solvent, and natural or synthetic resins including mastic, damar, synthetic resins, etc., as the resin ingredient is compatible with ingredients such as castor oil, acetates or lower alcohols for better fluidity and for better protection against the effects of humidity. It is also compatible with linseed oil or similar oils of which a small percentage like 2% may be added in cases of very hard resins.

As is well known, humidity is one of the main contributing causes of blooming, opaqueness and other forms of deterioration. It has been found advisable or even necessary to incorporate ingredients to combat this besides linseed oil, castor oil, etc. in standard varnish solutions whereas in the new varnish solution these compounds may be dispensed with or reduced to a minimum. Eliminating these compounds altogether is a critical consideration to reduce the risks of future discoloration when varnishes are used as such or in retouching processes and in mixing with paints.

The utilization of d-limonene per se, or as part of a mixture with standard dipentene, as a solvent for resins should not be confused with standard dipentene heretofore used in varnishes as a solvent as in Examples 3 and 4 of U.S. Patent 2,644,261.

Dipentene in attainable standard forms as heretofore furnished by laboratories of chemical supply houses varies in oxidation and evaporation rates, and in specific gravity. In specimens of dipentene having a boiling point of 52 to 53° C. at pressure of 10 mm. mercury, a range of specific gravity of .845 to .860 was observed; in others after prolonged standing a yellow coloration was discernible and specific gravity proved to be .900 to .930. Such variations and qualities are attributable to impurities which have been found difficult to remove in production thereof. Dipentene has been made from residues in the distillation of wood turpentine, the latter coming from aged tree stumps and being of variable composition. Dipentene has also been obtained by fractionation of oils extracted from pine wood.

To overcome certain disadvantages of standard or impurity-containing dipentene, a more stable, definite and well defined product chemically related to it, such as d-limonene, has herein been utilized as a solvent or solvent ingredient to give better results than heretofore available.

D-limonene is obtained from essential oils of the citrus fruits. Purification for removal of color and odor gives a product as produced by the laboratories of chemical supply houses with boiling point of 175–177° C. at 760 mm. mercury and specific gravity of about 0.840.

D-limonene and dipentene of maximum purity have the same chemical formula in composition, but the substances differ with respect to impurities and optical behavior. D-limonene (dextro-limonene) turns the plane of polarized light to the right or clockwise, while l-limonene (levo-limonene) turns the plane to the left or counterclockwise. Dipentene is regarded as dl-limonene containing equal amounts of d-and l-limonene and is optically inactive.

Varnishes prepared with d-limonene or mixtures of d-limonene and standard dipentene instead of current solvents excel with respect to optical clarity and other characteristics mentioned. This seems due to the optical qualities of the d-limonene. Besides this valuable quality it has the further ones of being non-poisonous, has an agreeable odor and apparently undergoes no oxidation nor polymerization into sticky material.

Under particular conditions, with exceptional transparency and clarity of light reflected by grey (black-white) or colored surfaces, one realizes the phenomena of exhilarating beauty and truth in art. Density as well as intensity of scale, and most delicate variations in value of hues, increased ranges of perspective, important pictorial details such as brushstroke finesse, impasto and individual techniques are all brought into proper light and relationship to each other. New three-dimensional illusions are created. The deadly frozenness of still pictures is finally overcome and, in its place, inherent living qualities of "suspended motion" brought forward. With augmented perceptibility of these factors, the grandeur and pictorial balance imagined by the inventive genius of the artist is now revealed in its full splendor, unhidden for all to see.

The contribution of d-limonene as a new solvent element in the combinations above disclosed and described is critical for effecting the improvements mentioned.

It is understood that minor changes and variations of the invention in the compositions, percentages of ingredients, methods of production and applications as described may all be resorted to without departing from the spirit of the invention and the scope of the appended claims. It is further understood that under certain circumstances as in the use of very hard resins, the cetyl alcohol or octadecanol can in part or wholly be replaced by the softer and lower melting tetradecanol or related compounds; and this modification may also be considered within the scope of the appended claims.

We claim:

1. The process of protecting or restoring or enhancing the beauty of image-bearing surfaces of objects of art consisting essentially in applying thereto a composition comprising a solution of varnish resins in d-limonene and drying to remove substantially all of the solvent.

2. A process as set forth in claim 1 wherein the composition contains other paint ingredients.

3. A process as set forth in claim 2 wherein the paint ingredients include pigments.

4. The process of protecting or restoring or enhancing the beauty of image-bearing surfaces of objects of art consisting essentially in applying thereto a solution of varnish resins in a mixture of d-limonene and dipentene, wherein the amount of d-limonene is at least fifty percent of the solvent, drying to remove substantially all of the solvent and reducing the residuals to not more than substantially half of the residuals of 100% dipentene solvent.

5. A resinous composition comprising a varnish resin and at least 160% by weight based on the varnish resin content of d-limonene as the solvent therefor.

References Cited

UNITED STATES PATENTS

| | | | |
|---|---|---|---|
| 2,644,261 | 7/1953 | Goetz | 106—237 |
| 3,132,115 | 5/1964 | Pschorr et al. | 260—29.8 |

FOREIGN PATENTS

| | | |
|---|---|---|
| 676,100 | 12/1963 | Canada. |

OTHER REFERENCES

E. Gildemeister: The Volatile Oils, 1913 ed., J. Wiley & Sons (pp. 312–313).

A. and E. Rose, The Condensed Chemical Dictionary, 1956 ed., Reinhold Publishing Corporation, p. 399.

ALEXANDER H. BRODMERKEL, *Primary Examiner.*

MORRIS LIEBMAN, *Examiner.*

T. MORRIS, *Assistant Examiner.*